June 18, 1963     D. I. PULLEN     3,094,249
POWDER DISPENSING APPARATUS
Filed April 12, 1960
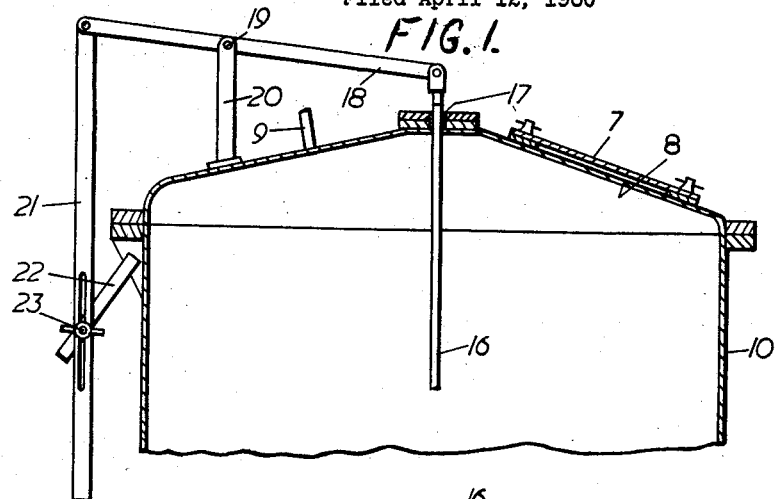
FIG. 1
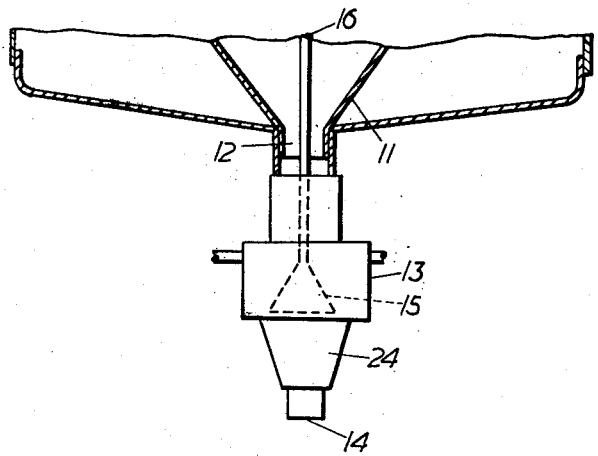
FIG. 2
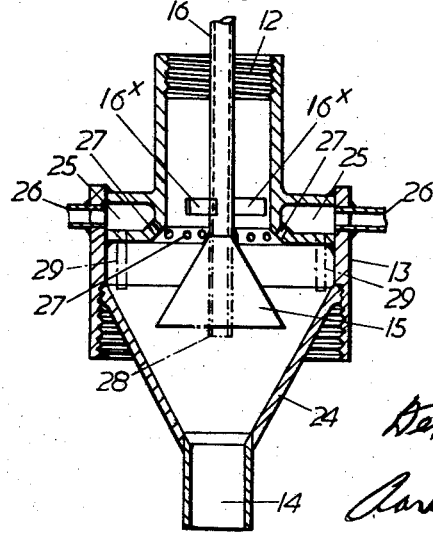
Inventor
Dennis I. Pullen
By Aaron R. Townsend
Attorney

United States Patent Office 3,094,249
Patented June 18, 1963

3,094,249
POWDER DISPENSING APPARATUS
Dennis Ian Pullen, Hove, Sussex, England, assignor to The British Oxygen Company Limited, a British company
Filed Apr. 12, 1960, Ser. No. 28,508
Claims priority, application Great Britain Apr. 14, 1959
3 Claims. (Cl. 222—193)

This invention relates to an improved apparatus for dispensing powdered materials from a container such as a hopper, the powdered material being entrained in a carrier gas in a mixing chamber and conveyed along a delivery pipe by the carrier gas.

The object of the invention is to provide a powder dispensing apparatus of improved construction, and which is particularly suitable for achieving high powder delivery rates, as is required for example in the treatment of molten metals by the addition of powdered materials.

According to the invention, apparatus for dispensing powdered materials comprises a container for powdered material having a bottom outlet which opens downwardly into a mixing chamber and which is controlled by a vertically adjustable bell valve located in said chamber, means being provided for injecting pressurised carrier gas into the upper part of the chamber so as to sweep downwardly over the upwardly presented surface of the bell valve, the mixing chamber being provided with a bottom outlet for mixed powder and carrier gas, and means being provided for pressurising the container above the powder level therein.

The carrier gas may be injected into the mixing chamber in such manner that besides sweeping downwardly over the surface of the bell valve it also swirls within the mixing chamber.

Additional carrier gas may be injected downwardly into the mixing chamber through a passage which extends downwardly through the bell valve itself, and in this connection said passage may be conveniently provided by the bore of a vertically disposed tube which supports the valve and which is movable vertically from the exterior of the apparatus for effecing adjustment of the bell valve. Alternatively, the additional carrier gas may be injected through holes in the periphery of the bell valve.

Additional carrier gas may be injected downwardly into the mixing chamber so as to sweep over at least the lower portion of the walls of the mixing chamber, and in this connection said lower portion of the walls of the mixing chamber may converge towards the bottom outlet of the chamber.

An emobdiment of the invention will now be described with reference to the accompanying drawings in which:

FIG. 1 is a diagrammatic side elevation depicting the powder dispensing apparatus.

FIG. 2 is a diagrammatic sectional side elevation, to an enlarged scale, showing constructional details of the mixing chamber of the apparatus shown in FIG. 1.

Referring to FIG. 1 of the drawings, the powder dispensing apparatus comprises a gas-tight powder hopper 10 having a removable gas-tight cover plate 7 which seals a charging opening 8. The hopper 10 has a convergent conically-shaped base portion 11, so that powdered material contained in the hopper is fed by gravity through a bottom outlet 12, the latter opening downwardly into the interior of a mixing chamber indicated generally by the reference numeral 13. The mixing chamber 13 also has a bottom outlet at 14 to which a delivery pipe (not shown) would be connected.

Referring also to FIG. 2, the bottom powder outlet 12 of the hopper 10 (which functions also as the powder inlet of the mixing chamber 13), is controlled by a vertically adjustable bell valve 15, which is shown in an open position in FIG. 2. The bell valve 15 is shown as being supported by a tube 16 which passes upwardly through the interior of the hopper 10 and extends to the exterior thereof through a gas-tight gland 17 (FIG. 1). The tube 16 has its upper end connected to one end of a lever 18 which is fulcrummed at 19 to a bracket 20, the other end of the lever 18 being connected to a vertically slidable manual adjusting bar 21. The bar 21 is moved vertically to effect vertical adjustment of the bell valve 15 in relation to the bottom powder outlet 12 of the hopper 10, and the bar 21 co-operates with an associated guide bracket 22 mounted on the hopper 10, while a simple nut-and-screw locking mechanism is indicated at 23. Radial arms 16$^x$ (FIG. 2), located on the tube 16 just above the bell valve 15, serve to centralise the tube and the valve relative to the outlet opening 12.

The mixing chamber 13 has its upper portion of generally cylindrical form, while the lower portion 24 of its walls converge towards the bottom outlet 14, the lower portion 24 being of frusto-conical form. The upper cylindrical portion of the mixing chamber 13 is fabricated to provide a top wall which includes an annular carrier gas inlet manifold 25, to which pressurised carrier gas is supplied by one or more conduits, two of which are indicated at 26. Pressure gas is also fed to the top of the hopper 10, as by a conduit indicated at 9, so that the hopper is pressurised above the powder level therein, and the pressure gas fed to the top of the hopper 10 may be taken from the same source which supplies the carrier gas.

A ring of jet orifices 27 (FIG. 2), direct the pressurised carrier gas from the inlet manifold 25 into the mixing chamber as downwardly and inwardly inclined gas jets which sweep over the upwardly presented surface of the bell valve 15.

In operation of the apparatus, powdered material enters the mixing chamber 13 from the hopper 10 through the bottom outlet 12, the rate of powder flow depending upon the degree of opening of the bell valve 15. The falling powder encounters the upwardly presented surface of the valve 15, which is being swept by gas jets issuing from the orifices 27. Powder entrained in the carrier gas leaves the mixing chamebr 13 through the bottom outlet 14 of the chamber.

Variations can be made in some of the structural features shown in the drawings. For example, the mechanism for adjusting the bell valve 15 can be different from the mechanism illustrated, and the jet orifices 27 leading from the gas inlet manifold could be replaced by a single annular slot, or by a ring of separate slots.

It may be desirable to provide for a higher rate of carrier gas flow than can be achieved by means of the inlet manifold 25 and the jet orifices 27, and one way of providing for the injection of additional carrier gas into the mixing chamber 13 is by establishing a supply of carrier gas to the interior of the tube 16 in any suitable way, and by extending the tube 16 so that it passes through the bell valve 15, as indicated in chain-dot lines at 28 in FIG. 2. Moreover, the tube 16 could be formed with gas outlets (not shown) in the vicinity of the bottom outlet 12, so that a degree of fluidisation of the powdered material is obtained at that point. Alternatively, carrier gas from the tube 16 could issue from peripheral holes (not shown) in the bell valve 15.

Another way of injecting additional carrier gas into the mixing chamber 13 is by providing a ring of jet tubes, two of which are indicated in chain-dot lines at 29 in FIG. 2, extending downwardly from the carrier gas inlet manifold 25 to provide downwardly directed carrier gas jets which sweep over the lower portion 24 of the mixing chamber 13. The tubes 29 could be replaced by an annular passage in the manifold 25, or by a ring of slots or jet orifices in the manifold.

Another modification may be applied to the jet orifices 27, which are shown in FIG. 2 as being inclined downwardly with their axes intersecting the vertical axis of the mixing chamber 13. The axes of the jet orifices 27 may also be inclined sideways, so that while the gas jets still sweep the surface of the bell valve 15 in a downward direction, the gas jets also produce a swirling motion of the carrier gas about the vertical axis of the mixing chamber.

In tests of the apparatus above described, at a carrier gas inlet pressure of 50 p.s.i., the apparatus proved capable of dispensing 100 pounds of powdered lime in 200 cubic feet of oxygen gas per minute, and the apparatus is well suited for use with oxygen gas, although not restricted thereto, due to the fact that in its construction there is no necessity to employ organic structural materials such as rubber, particularly as regards the powder flow control valve, since the bell valve 15 can be of wholly metallic construction.

I claim:

1. In apparatus for dispensing powdered materials from a hopper in a stream of carrier gas, the combination of a powder hopper, a mixing chamber defined by a top wall, side walls, and a downwardly convergent bottom wall with a central outlet opening, said top wall having a central opening therein in communication with the bottom opening of the hopper and also having an internal annular manifold chamber therein, a bell valve in said mixing chamber, said bell valve having an upwardly-presented and upwardly-convergent surface, means slidably mounting said bell valve for adjustment of said valve relative to the opening in the top wall of the mixing chamber for controlling the rate of powder flow through said opening, and conduit means for supplying carrier gas to the manifold chamber within the top wall of the mixing chamber, said top wall having a ring of downwardly-inclined jet orifices therein directed at said bell valve, which operate to inject carrier gas from the manifold chamber to sweep downwardly over the upwardly-presented surface of the bell valve, and at least one additional jet orifice which operates to inject carrier gas through said bell valve.

2. In apparatus for dispensing powdered materials from a hopper in a stream of carrier gas, the combination of a powder hopper, a mixing chamber defined by a top wall, side walls, and a downwardly convergent bottom wall with a central outlet opening, said top wall having a central opening therein in communication with the bottom opening of the hopper and also having an internal annular manifold chamber therien, a bell valve in said mixing chamber, said bell valve having an upwardly-presented and upwardly-convergent surface, means slidably mounting said bell valve for adjustment of said valve relative to the opening in the top wall of the mixing chamber for controlling the rate of powder flow through said opening, and conduit means for supplying carrier gas to the manifold chamber within the top wall of the mixing chamber, said top wall having a ring of downwardly-inclined jet orifices directed at said bell valve therein, which operate to inject carrier gas from the manifold chamber to sweep downwardly over the upwardly-presented surface of the bell valve, and jet tubes depending from said top wall which operate to inject carrier gas from the manifold chamber to sweep over the convergent bottom wall of the mixing chamber.

3. In apparatus for dispensing powdered materials from a hopper in a stream of carrier gas, the combination of a mixing chamber defined by a top wall, side walls, and a downwardly convergent bottom wall with a central outlet opening, said top wall having a central opening therein in communication with the bottom opening of the hopper and also having an internal annular manifold chamber therein, a bell valve in said mixing chamber, said bell valve having an upwardly-presented and upwardly-convergent surface, means for slidably mounting said bell valve for adjustment of said valve relative to the opening in the top wall of the mixing chamber for controlling the rate of powder flow through said opening, conduit means for supplying carrier gas to the manifold chamber within the top wall of the mixing chamber, said top wall having a ring of downwardly-inclined jet orifices therein directed at said bell valve, which operate to inject carrier gas from the manifold chamber to sweep downwardly over the upwardly-presented surface of the bell valve, at least one additional jet orifice which operates to inject carrier gas through said bell valve, and jet tubes depending from said top wall which operate to inject carrier gas from the manifold chamber to sweep over the convergent bottom wall of the mixing chamber.

References Cited in the file of this patent

UNITED STATES PATENTS

| 1,604,712 | Nordstrom et al. | Oct. 26, 1926 |
| 1,802,205 | Fox et al. | Apr. 21, 1931 |
| 2,077,898 | Rolff | Apr. 20, 1937 |
| 2,305,724 | Luetzelschwab | Dec. 22, 1942 |
| 2,372,957 | Keefer | Apr. 3, 1945 |
| 2,594,072 | Ridley | Apr. 22, 1952 |
| 2,807,393 | Metrailer et al. | Sept. 24, 1957 |
| 2,836,097 | Garman | May 27, 1958 |
| 2,850,214 | Rooney | Sept. 2, 1958 |
| 2,914,820 | Peterson | Dec. 1, 1959 |
| 2,987,221 | Milton | June 6, 1961 |

FOREIGN PATENTS

| 798,784 | Great Britain | July 30, 1958 |